United States Patent
Dooley et al.

(10) Patent No.: US 10,229,066 B2
(45) Date of Patent: Mar. 12, 2019

(54) QUEUING MEMORY ACCESS REQUESTS

(71) Applicant: ARM LIMITED, Cambridge (GB)

(72) Inventors: Miles Robert Dooley, Austin, TX (US); Matthew Andrew Rafacz, Austin, TX (US); Huzefa Moiz Sanjeliwala, Austin, TX (US); Michael Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 182 days.

(21) Appl. No.: 15/281,502

(22) Filed: Sep. 30, 2016

(65) Prior Publication Data

US 2018/0095893 A1 Apr. 5, 2018

(51) Int. Cl.
| | |
|---|---|
| *G06F 12/08* | (2016.01) |
| *G06F 12/1045* | (2016.01) |
| *G06F 12/0862* | (2016.01) |
| *G06F 12/0897* | (2016.01) |
| *G06F 9/30* | (2018.01) |

(52) U.S. Cl.
CPC ............ *G06F 12/1045* (2013.01); *G06F 9/30* (2013.01); *G06F 12/0862* (2013.01); *G06F 12/0897* (2013.01); *G06F 9/3016* (2013.01); *G06F 2212/1016* (2013.01); *G06F 2212/50* (2013.01); *G06F 2212/602* (2013.01)

(58) Field of Classification Search
CPC ............ G06F 12/1045; G06F 12/0862; G06F 12/0897; G06F 9/3016

USPC .................................................. 711/169, 137
See application file for complete search history.

(56) References Cited

U.S. PATENT DOCUMENTS

| | | | | |
|---|---|---|---|---|
| 5,892,963 | A | * 4/1999 | Iadonato | ............... G06F 9/3836 712/215 |
| 9,298,469 | B2 | * 3/2016 | Busaba | ...................... G06F 9/44 |
| 2014/0025873 | A1 | * 1/2014 | Nguyen | ................ G06F 3/0613 711/103 |
| 2016/0179549 | A1 | * 6/2016 | Xekalakis | ............. G06F 9/3818 712/208 |

\* cited by examiner

*Primary Examiner* — Pierre Miche Bataille
(74) *Attorney, Agent, or Firm* — Nixon & Vanderhye P.C.

(57) ABSTRACT

A data processing apparatus is provided including queue circuitry to respond to control signals each associated with a memory access instruction, and to queue a plurality of requests for data, each associated with a reference to a storage location. Resolution circuitry acquires a request for data, and issues the request for data, the resolution circuitry having a resolution circuitry limit. When a current capacity of the resolution circuitry is below the resolution circuitry limit, the resolution circuitry acquires the request for data by receiving the request for data from the queue circuitry, stores the request for data in association with the storage location, issues the request for data, and causes a result of issuing the request for data to be provided to said storage location. When the current capacity of the resolution circuitry meets or exceeds the resolution circuitry limit, the resolution circuitry acquires the request for data by examining a next request for data in the queue circuitry and issues a further request for the data based on the request for data.

19 Claims, 6 Drawing Sheets

QUEUING MEMORY ACCESS REQUESTS

TECHNICAL FIELD

The present disclosure relates to data processing. In particular, it relates to memory systems.

DESCRIPTION

In a data processing apparatus, requests to access a memory hierarchy often proceed through one or more queues in which details of the request are temporarily stored. Often this information is used to match a request for memory access with the incoming result from that access. In order to keep circuit sizes and power consumptions low, such queues must be limited in capacity. However, when these queues get full, the system often stalls until such time as space in the queue can be freed up. This can be undesirable because such stalls can reduce the speed at which the system can operate.

SUMMARY

Viewed from a first example configuration, there is provided a data processing apparatus comprising: queue circuitry to respond to control signals each associated with a memory access instruction, and to queue a plurality of requests for data, each associated with a reference to a storage location; resolution circuitry to acquire a request for data, and to issue said request for data, said resolution circuitry having a resolution circuitry limit; and when a current capacity of said resolution circuitry is below said resolution circuitry limit, said resolution circuitry acquires said request for data by receiving said request for data from said queue circuitry, stores said request for data in association with said storage location, issues said request for data, and causes a result of issuing said request for data to be provided to said storage location; and when said current capacity of said resolution circuitry meets or exceeds said resolution circuitry limit, said resolution circuitry acquires said request for data by examining a next request for data in said queue circuitry and issues a further request for said data based on said request for data.

Viewed from a second example configuration, there is provided a data processing method comprising: responding to control signals each associated with a memory access instruction, to form a queue of requests for data, each associated with a reference to a storage location; acquiring, at resolution circuitry having a resolution circuitry limit, a request for data; issuing said request for data; when a current capacity of said resolution circuitry is below said resolution circuitry limit, receiving said request for data at said resolution circuitry from said queue circuitry, storing said request for data in association with said storage location and causing a result of issuing said request for data to be provided to said storage location; and when said current capacity of said resolution circuitry meets or exceeds said resolution circuitry limit, examining, at said resolution circuitry, a next request for data in said queue and issuing a further request for said data based on said request for data.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: queue circuitry to respond to control signals each associated with a memory access instruction, and to queue a plurality of requests for data, each associated with a reference to a storage location; resolution circuitry to acquire a request for data, and to issue said request for data, said resolution circuitry having a resolution circuitry limit; and when a current capacity of said resolution circuitry is below said resolution circuitry limit, said resolution circuitry acquires said request for data by receiving said request for data from said queue circuitry, stores said request for data in association with said storage location, issues said request for data, and causes a result of issuing said request for data to be provided to said storage location; and when said current capacity of said resolution circuitry meets or exceeds said resolution circuitry limit, said resolution circuitry acquires said request for data by examining a next request for data in said queue circuitry and issues a further request for said data based on said request for data.

A memory access instruction (either a write to or read from memory), when decoded, can result in one or more control signals being generated and passed to a data processing apparatus as described above. Such control signals are passed to queue circuitry, which causes one or more data access requests to be stored in a queue. Each of the data access requests references a storage location. In the case of a memory read request, the storage location corresponds with a storage location (e.g. a register address) where the retrieved data is to be stored. In the case of a memory write request the storage location corresponds with an address in memory where the written data is to be stored. The location could be cached in the memory hierarchy so that the storage location corresponds with, e.g. a cache address where a cache line comprising the written data is to be stored. Resolution circuitry receives requests from the queue circuitry (thereby causing the corresponding entry in the queue circuitry to be deleted) and the received request is stored in the resolution circuitry together with the storage location. A further request (corresponding to the received request) is then issued to downstream memory components. After a period of time, a result of the further request is returned to the resolution circuitry, which causes the returned data to be provided at the storage location associated with the request. The request is then removed from the resolution circuitry queue. The queue of the resolution circuitry has a finite capacity (the resolution circuitry limit). Hence, when the queue in the resolution circuitry becomes full, it is unable to receive requests from the queue circuitry until the requests that it is tracking are resolved. In such a situation, the resolution circuitry examines the queue circuitry for a next request for data (e.g. it obtains the next request for data that is in the queue circuitry itself), without that next request being removed from the queue circuitry or added to the queue of the resolution circuitry. The corresponding further request is then issued. However, since no entry is added to the resolution circuitry, this request is not tracked and no specific action is taken when the result of the data access is returned. However, by still issuing the further request, it is possible to make the requested data readily available so that, in due course, when the resolution circuitry queue empties and the resolution circuitry receives the request from the queue circuitry, it will be possible to return the data quickly.

Even though the upstream queue (e.g. of the resolution circuitry) is full, the downstream queue may have additional unused capacity. This can be leveraged, despite the full upstream queue, so that the requested data can be readied. Consequently, in due course when the upstream queue is able to receive the data request, the request can be resolved more quickly than if no action had been taken.

In some embodiments, said resolution circuitry acquires an oldest request for data from said queue circuitry. Such a procedure is repeatable so that a second time around, the next oldest request for data will be examined by the resolution circuitry, and so on. Consequently, older requests for data, which may need to be resolved more quickly, can be less affected by the stalling of the resolution circuitry.

In some embodiments, each of the requests for data comprises an indication of whether said resolution circuitry has examined that request for data; when said current capacity of said resolution circuitry meets or exceeds said resolution circuitry limit, said resolution circuitry additionally sets said indication to indicate that request for data has been examined; and said resolution circuitry acquires an oldest request for data from said queue circuitry with an indication that request for data is unexamined by said resolution circuitry. In such embodiments, a special indication is used to indicate whether or not the request for data has been handled by the resolution circuitry despite not yet having been "handed over" to the resolution circuitry. This can be implemented through the use of a single bit, with a '1' indicating that the request has been handled and a '0' indicating that the request has not been handled. In this way, it is possible to keep track of requests for which a further request has been issued by the resolution circuitry so that the same further request is not issued repeatedly. In these embodiments, when the resolution circuitry acquires a next request, the next request is the oldest request in the queue circuitry for which no indication is set (e.g. where the value of the flag is '0').

In some embodiments, the data processing apparatus further comprises a cache that forms part of a memory hierarchy, to store data retrieved from said memory hierarchy.

In some embodiments, said cache comprises a level one cache; and said queue circuitry responds to each queued request for data by accessing said data from the level one cache when it is present in said level one cache and providing said request for data to said resolution circuitry when said data is absent from said level one cache and said current capacity of said resolution circuitry is below said resolution circuitry limit. A level one cache is often used as a small, fast cache for which most recently accessed data (not in the registers) can be quickly obtained. If a data access request is issued in respect of data that is already stored in the level one cache, then there may be no need for a further request to be issued in respect of that data. Instead, the data can be more quickly accessed by directly querying the level one cache.

In some embodiments, said data processing apparatus further comprises a fill buffer to receive said request for data and to acquire said data from said memory hierarchy, wherein said queue circuitry is an issue queue to receive said control signals from an instruction decoder; said request for data is a memory read request to read said data from said memory hierarchy; said further request for data comprises a memory prefetch request to read said data from said memory hierarchy and provide said data to said level one cache; said resolution circuitry comprises a load replay queue; and when said current capacity of said resolution circuitry meets or exceeds said resolution circuitry limit, said resolution circuitry issues said further request for said data by inserting an entry in said fill buffer instead of in said resolution circuitry. The fill buffer could receive the request for data either from the resolution circuitry as a tracked request for data, or it could be forwarded by the resolution circuitry, effectively coming straight from the issue queue itself if the resolution circuitry's queue is full. For example, the further request could be the same as the request.

In some embodiments, said entry is a prefetch entry to provide said data to said level one cache. In such embodiments, when the resolution circuitry (comprising the load replay queue) is full, an entry is taken from the issue queue and is directly added to the fill buffer without being added to (or tracked) in the load replay queue. This has the effect of acting as a cache prefetch so that the data will be fetched from the memory hierarchy and, having nowhere to be returned to by virtue of a lack of entry in the load replay queue, will simply be stored in the cache. Consequently, when the load replay queue starts to empty, and the corresponding entry in the issue queue is able to be handled, the data will already be in the cache, thereby resulting in the request for that data being resolved quickly. In particular, it may not be necessary for a request to memory to then have to be executed, which saves the time of querying memory.

In some embodiments, said queue circuitry comprises an issue queue to receive control signals from an instruction decoder; said request for data is a memory store request to store said data to said memory hierarchy; and said resolution circuitry comprises a store address buffer.

In some embodiments, said data processing apparatus further comprises: acquisition circuitry to acquire said data from said memory hierarchy, wherein said further request for data comprises a memory read request to read said data from said memory hierarchy; and when said current capacity of said resolution circuitry meets or exceeds said resolution circuitry limit, said resolution circuitry issues said further request for said data by inserting an entry in said acquisition circuitry instead of in said resolution circuitry. The acquisition circuitry could, for example, be a recent store tracker, which in some embodiments tracks a subset of lines in a level one cache that have been recently modified. In other embodiments, the acquisition circuitry is a fill buffer, which writes data back to a level one cache after having retrieved it from memory. When a memory access instruction in the form of a store/write instruction is issued, it may be necessary to issue a read request if the data is not yet present in the local cache. However, if the store address buffer is full, then the read request would not ordinarily be possible. By inserting the further request into the acquisition circuitry, the data can be prefetched into a local cache. At that point, at the time that the internal queue of the store address buffer empties and the request can be inserted, the data is already in a local cache and so can be modified without having to send a query to memory, which can take an extended period of time.

In some embodiments, said further request for data comprises: an ownership request to obtain ownership of said data. Where the data value is to be changed, it can be necessary in order to obtain ownership of the data value in order to maintain coherency in the system.

In some embodiments, said cache comprises a level two cache. A level two cache is typically larger (and therefore slower) than a level one cache and is traditionally downstream from the level one cache in a memory hierarchy. As a consequence of this, the level one cache typically stores the most recently accessed data and is checked first. The level two cache typically stores less most frequently access data and is checked before the memory itself is accessed to obtain data.

In some embodiments, said data processing apparatus further comprises: a prefetch unit to provide unsolicited data to said cache in dependence on training information, wherein said further request is provided to said prefetch unit. The prefetch unit could be a level two prefetch unit, in which data is fetched before it is explicitly requested and then stored in a level two cache.

In some embodiments, said queue circuitry comprises a load replay queue; said request for data is a memory read request to read said data from said memory hierarchy; said resolution circuitry comprises a fill buffer; and when said current capacity of said resolution circuitry meets or exceeds said resolution circuitry limit, said further request is a memory prefetch request for said data to be read from said memory hierarchy and provided to said level two cache. Such embodiments relate to the situation in which the fill buffer, which is used to bring data into a level one cache is full (i.e. when its current capacity meets or exceeds the fill buffer limit). In such cases, a stall can occur if further instructions necessitate adding entries to the fill buffer. To handle this situation, the fill buffer issues a further request in the form of a memory prefetch request in respect of a next entry in the queue circuitry. This causes data to be prefetched and, rather than being entered into the level one cache (by virtue of a missing entry in the fill buffer), the entry is stored in the level two cache. In due course, when the fill buffer becomes available (i.e. when some of its entries are removed), the entry is encountered again and this time a request to fill the level one cache can be sent. However, with the data having been previously prefetched into the level two cache, this request can proceed quickly as it is possible to obviate the need to access main memory.

In some embodiments, said data processing apparatus further comprises: a fill buffer to receive said request for data from said resolution circuitry and to acquire said data from said memory hierarchy, said fill buffer having a fill buffer limit, wherein said request for data is a memory read request to read said data from said memory hierarchy; said resolution circuitry comprises a load replay queue; and when a current capacity of said fill buffer meets or exceeds said fill buffer limit, said further request is configured as a memory prefetch request for said data to be read from said memory hierarchy and provided to said level two cache. These embodiments relate to the situation in which both the load replay queue and the fill buffer are full (e.g. at their various capacities). In such situations, when there are memory requests in the queue circuitry, it is possible for the resolution circuitry to examine some of these requests and cause a memory prefetch request to be issued. This causes the data to be prefetched and stored in the level two cache. In due course, when either of the load replay queue or the fill buffer are freed up, it is possible for an entry from the queue to be entered and for the data to be fetched and either promoted to the level one cache (if the load replay queue was still full) or else returned (if the load replay queue and fill buffer were freed up) by accessing the data from the level two cache rather than from memory. Accordingly, even though the full memory operation cannot be performed, the data can be made "ready" by having it available in the level two cache for faster access.

In some embodiments, said data processing apparatus further comprises: acquisition circuitry to receive said request for data and said further request for data from said resolution circuitry and to acquire said data from said memory hierarchy, said acquisition circuitry having an acquisition circuitry limit, wherein said queue circuitry comprises an issue queue to receive said control signals from an instruction decoder; said request for data is a memory store request to store said data to said memory hierarchy; and said resolution circuitry comprises a store address buffer. For example, the acquisition circuitry could be a recent store tracker.

In some embodiments, when a current capacity of said acquisition circuitry meets or exceeds said acquisition circuitry limit, said further request is configured as a memory prefetch request for said data to be read from said memory hierarchy and provided to said level two cache. Such embodiments relate to the situation in which a recent store tracker and the resolution circuitry (e.g. the store address buffer) are both full. Rather than causing memory requests in the form of memory store requests to be stalled, such requests instead cause level two cache prefetch requests to be issued. This causes the data to be fetched to a level two cache so that, in due course, the data value can be modified locally in a cache. Accordingly, even though the request cannot be serviced immediately, it is "primed" so that it can be serviced more quickly when the request is ultimately serviceable.

In some embodiments, when a current capacity of said acquisition circuitry meets or exceeds said acquisition circuitry limit, said further request for data comprises an ownership request to obtain ownership of said data. Where the data value is to be changed, it can be necessary in order to obtain ownership of the data value in order to maintain coherency in the system.

In some embodiments, said data processing apparatus further comprises a level two translation lookaside buffer, wherein said resolution circuitry is a level one translation lookaside buffer; and further request for said data causes said data to be stored in said level two translation lookaside buffer. A translation lookaside buffer caches translations between virtual memory addresses and physical memory addresses. As with other forms of cache, a translation lookaside buffer could have a number of different levels varying in size and speed. A cache's speed is typically inversely proportional to its size and hence a bigger level two translation lookaside buffer can be expected to be slower than a smaller level one translation lookaside buffer. Resolution circuitry (e.g. a translation lookaside buffer miss queue) can be used in order to acquire virtual/physical address translations to the level one translation lookaside buffer cache. However, when the queue within this circuitry becomes full, it is possible to continue to issue requests such that the retrieved translations are obtained (e.g. from main memory) and instead stored in the level two translation lookaside buffer. Thereafter, when the queue empties and the request for that translation can be properly handled, the relevant translation can be quickly found in the level two translation lookaside buffer cache rather than having to access main memory. Accordingly, latency can be improved without having to increase the sizes of the queue in the resolution circuitry.

Particular embodiments will now be described with reference to the figures.

Figure 1:
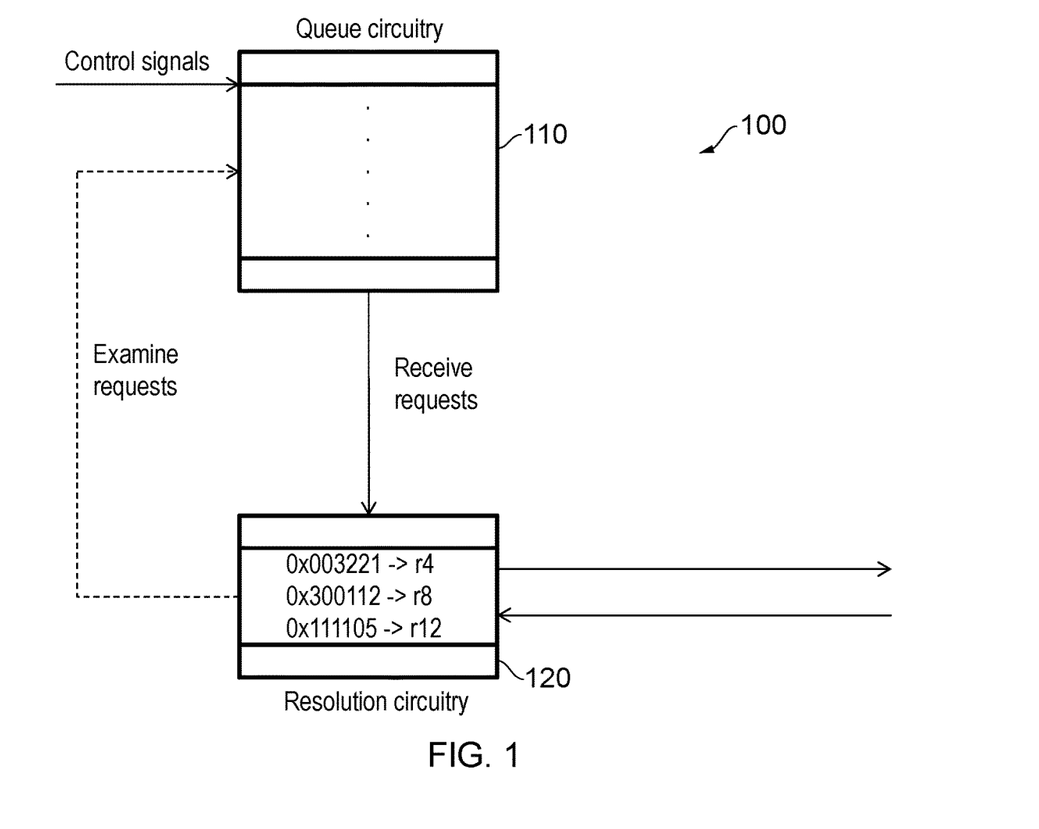
FIG. 1 illustrates a data processing apparatus in accordance with one embodiment.

FIG. 1 illustrates a data processing apparatus 100 in accordance with one embodiment. Queue circuitry 110 receives control signals from, for example, one or more processing units such as a load/store unit or instruction decoder. The control signals are associated with requests for data, e.g. memory access requests in the form of load instructions and store instructions. These are stored in the queue circuitry 110. Resolution circuitry 120 receives these requests from the queue circuitry 110, which are subsequently deleted from the queue circuitry 110. Each request is associated with a particular storage location to where the data is to be provided. Each data request and storage location are stored together by the resolution circuitry 120 as they are received. Furthermore, a further request is sent (or in some embodiments, the request is simply forwarded) downstream so that the requested data is returned. When the requested data is received back, the resolution circuitry 120 provides the data to the corresponding storage location by examining its internal queue, and deletes the corresponding entry. In FIG. 1, the resolution circuitry 120 is shown as indicating, for a particular memory address, the register to which the data in that memory address is to be provided.

However, at various points, the queue in the resolution circuitry 120 may become full. This can lead to a stall since further entries in the queue circuitry 110 cannot be resolved. Furthermore, once those entries can eventually be inserted into the resolution circuitry, it may be necessary to wait a period of time for the requested data to be returned. In order to limit these delays, the present embodiment examines the latest request in the queue circuitry and issues a request without storing anything in the (full) queue of the resolution circuitry 120. In due course, the resolution circuitry will empty and the request will be received in the normal course of events. However, the request for the data will already have been received and consequently will arrive more quickly than if an examination of the requests in the queue circuitry 110 had not taken place. This process can be repeated numerous times, each time, a next oldest entry of the queue circuitry 110 being examined. In order to prevent the same entry from repeatedly having requests issued (since entries are not deleted from the queue circuitry as a result of being examined), entries that have already been examined are marked and marked entries are not re-examined.

Figure 2:
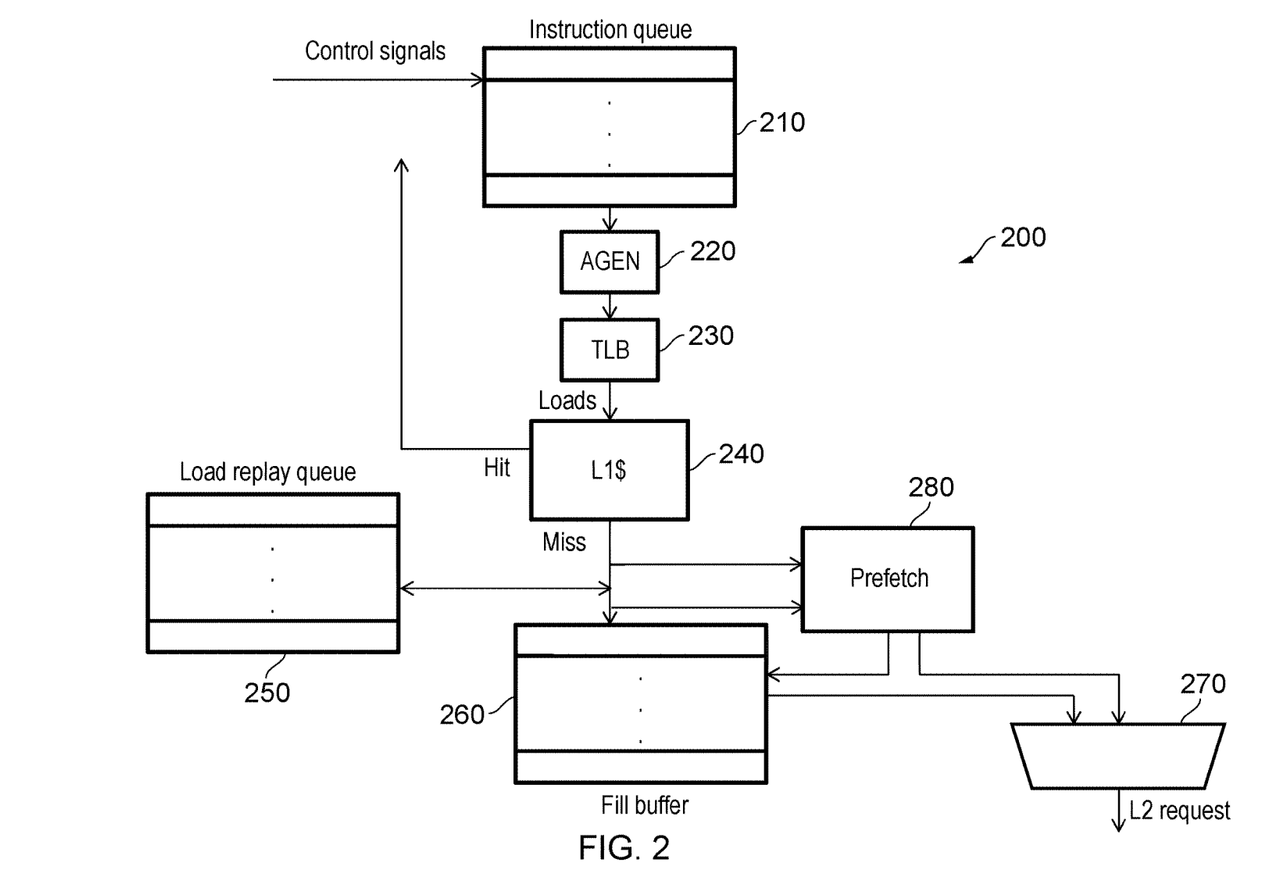
FIG. 2 shows an embodiment in which the data processing apparatus is a part of a memory system and the memory access request takes the form of a load request, in accordance with one embodiment.

FIG. 2 shows an embodiment in which the data processing apparatus 200 is a part of a memory system and the memory access request takes the form of a load request (i.e. retrieval of data from memory). An instruction queue 210 receives the control signals, that correspond to memory access instructions. The instructions pass through an address generator AGEN 220 for computing the virtual address and TLB 230 for translating the virtual address to a physical address. Load requests are then checked against a level one cache 240 to determine whether or not the requested data is found there. If so, i.e. if there is a 'hit' on the level one cache 240, then the data is returned. If not, i.e. if there is a 'miss' on the level one cache 240, then the request proceeds to a load replay queue 250. The load replay queue tracks pairs of storage locations and memory addresses so that when the requested data is returned, it can be provided to the correct storage location. In addition, the load replay queue 250 sends a further request (or forwards the request) on to a fill buffer 260. The fill buffer 260 acquires the data by issuing a level two cache request (for data to be inserted into the level one cache, which is sent to the level two cache) via a multiplexer 270 and returns the provided data back to the load replay queue 250, which fulfils the original request. In addition, the fill buffer 260 provides the data to the level one cache 240. A prefetcher 280 is also provided, which is able to be trained based on cache misses in order to predict data that will be required in the future. This can cause the prefetcher 280 to issue prefetch requests in the form of level one or level two cache requests via multiplexer 270 in order to prefetch data that is anticipated to be required in the future and provide it at the level one or level two cache. The prefetcher 280 can either issue such requests itself or it can effect a prefetch by causing the fill buffer 260 to obtain the data. Performing this action via the fill buffer 260 has the advantage that optimisations can be made regarding the fetching of data for example, if particular data is already in the process of being fetched, then the fill buffer 260 can avoid issuing a further (prefetch) request for that data.

In this embodiment, the instruction queue 210 acts as the queue circuitry while the load replay queue 250 acts as the resolution circuitry by, when it is full, inserting an entry into the fill buffer to cause data to be prefetched into the level one cache 240. The storage location associated with each request for data (memory access request) relates to a register location where the data is to be provided by the load replay queue when the data is retrieved.

Figure 3:
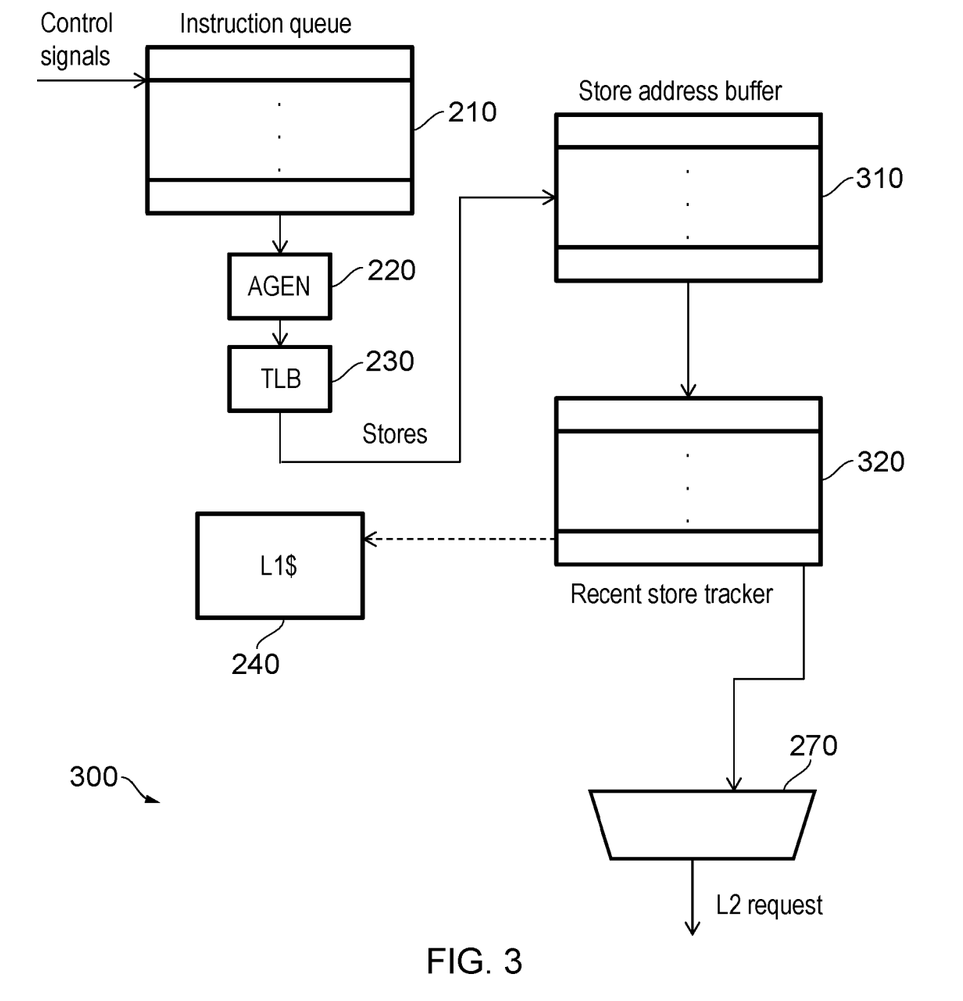
FIG. 3 shows an embodiment in which the data processing apparatus 300 is a part of a memory system and the memory access request takes the form of a store request in accordance with one embodiment.

FIG. 3 shows an embodiment in which the data processing apparatus 300 is a part of a memory system and the memory access request takes the form of a store request (i.e. modification of data in memory). The data processing apparatus again includes an instruction queue 210, AGEN 220, TLB 230, and level one cache 240 as previously described. In this embodiment, the store request passes through the store address buffer 310. From there, the recent store tracker 320 is checked to see whether the appropriate cache line can be found in the level one cache 240. If so, the update is performed in the level one cache 240. If not, the level one cache 240 must be checked, since the recent store tracker only stores a subset of entries of the level one cache 240. If the level one cache contains the relevant entry then that entry can be directly updated and the entry can be added to the recent store tracker 320. If not, then the recent store tracker 320 generates a further request for the data to be brought into the level one cache 240. For example, the data could be brought into the level one cache 240 by the recent store tracker 320 generating a level two cache request via multiplexer 270, which causes the data to be fetched from a level two cache into the level one cache 240. In this case, the storage location is a memory location, which is cached in the level one cache 240. The data update occurs to the locally cached version of the data (the memory location) and this is later written back to memory.

Figure 4:
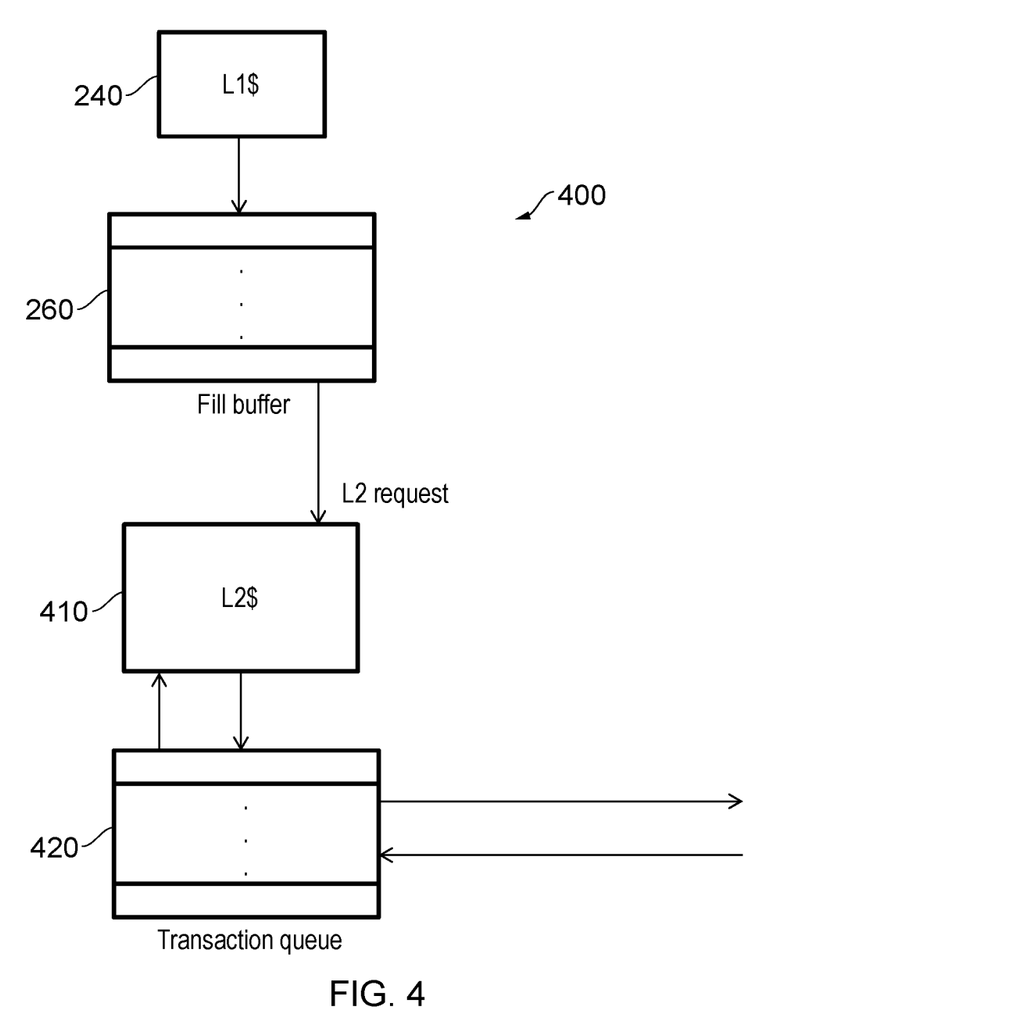
FIG. 4 schematically shows an embodiment in which the data processing apparatus forms part of a memory system in accordance with one embodiment.

In this embodiment, the queue circuitry comprises the instruction queue 210 while the resolution circuitry comprises the store address buffer 310. In some embodiments, the resolution circuitry also comprises the store data buffer, which comprises the data to be written while the store address buffer 310 holds the memory address to be written to (as well as certain control values such as the size of the update). When the store address buffer 310 is not full, the store instruction is entered into the store address buffer 310 and deleted from the instruction queue 210. From there, the process proceeds as previously described. However, if the store address buffer 310 is full, the store instruction cannot be taken into the store address buffer 310. However, the data may still be prefetched, if necessary, by the store address buffer issuing the further request to, e.g. the level two cache for the data to be provided to the level one cache. There are a number of ways in which such a further request (e.g. prefetch) can be issued such as passing a request to the fill buffer 260 or to a prefetcher 280 as already discussed FIG. 4 schematically shows an embodiment in which the data processing apparatus forms part of a memory system. The data processing apparatus includes a level one cache 240, for which missing requests are passed to a fill buffer 260. The fill buffer 260 issues requests to a level two cache 410, as previously discussed. In the event of a hit, the level two cache 410 returns the requested data value to the fill buffer 260. In the event of a miss, the request is forwarded to the transaction queue 420. The transaction queue 420 takes responsibility for obtaining the data request. For example, the transaction queue 420 could issue a further request (or forward the request) to a further cache, or could access a main memory to obtain the data. The transaction queue 420 obtains the requested data and stores this data in the level two cache 410.

In this embodiment there are a number of components that could correspond with the queue circuitry or the resolution circuitry.

In a first example, the queue circuitry corresponds with the instruction queue of FIG. 2. The resolution circuitry corresponds with the load replay queue 250 of FIG. 2. In this example, ordinarily, if the load replay queue 250 were full then this would result in an entry being inserted in the fill buffer 260 of FIG. 2. However, if the fill buffer 260 is also full, then this will have the result that a request is made for the data to be provided in the level two cache 410. If the data is not already in the level two cache 410, then an entry is inserted into the transaction queue 420 for the data to be obtained and provided back to the level two cache 410. As a consequence, the data is pre-fetched into the level two cache 410 so that it can be more easily accessed in the future.

In a second example, the queue circuitry corresponds with the load replay queue 250 of FIG. 2. The resolution circuitry corresponds with the fill buffer 260 of FIG. 2. Consequently, if the fill buffer 260 is full, then the fill buffer sends a request for the data to be prefetched into the level two cache 410. Again, this means that if the data was in the main memory, it can be more easily accessed in the future. In particular, the data may be entered into the level one cache when the fill buffer 260 becomes able to accept a new entry.

In a third example, the queue circuitry again corresponds with the instruction queue 210 of FIG. 3. The resolution circuitry corresponds with the recent store tracker 320. In this example, if the recent store tracker 320 is full and an entry cannot be inserted, then the recent store tracker 320 will send a level two cache request via the multiplexer 270. This proceeds to the level two cache 410. If the data is already in the level two cache 410 then no action is taken. Otherwise, an entry is inserted into the transaction queue 420 to obtain the data and insert it into the level two cache 410. In other words, a level two cache prefetch is performed. This data can then be provided to the level one cache 240 at a later time more easily and quickly than it could if the data was stored in a main memory.

In a fourth example, the queue circuitry corresponds with the store address buffer 310 shown in FIG. 3. The resolution circuitry corresponds with the fill buffer 260 of FIG. 2. Consequently, if the fill buffer 260 is full then a data storage request causes that data to be prefetched into the level two cache 410 rather than the level one cache 240. Again, the data (memory location) can then be quickly provided to the level one cache 240 at a later time.

Figure 5:
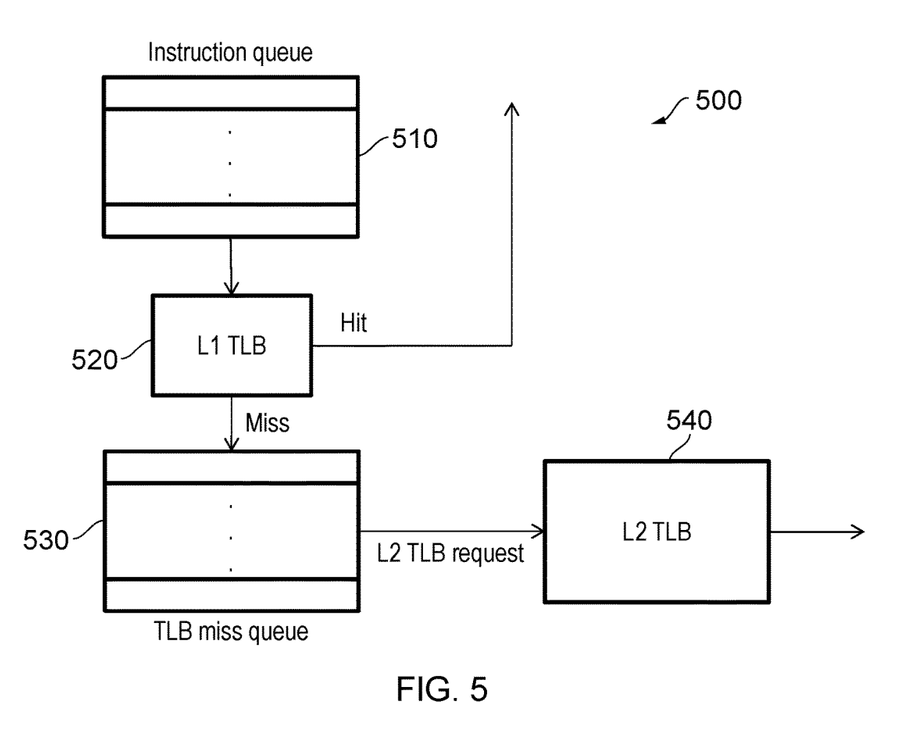
FIG. 5 schematically shows an embodiment in which the data processing apparatus forms part of the address translation system.

FIG. 5 schematically shows an embodiment in which the data processing apparatus 500 forms part of the address translation system. The address translation system is used to provide translations between virtual and physical memory addresses. Translation lookaside buffers are used to cache such translations. In this embodiment, the instruction queue 510 contains one or more memory access requests in respect of a virtual memory address. The level one translation lookaside buffer 520 is queried first for the virtual memory address. If the address is found, i.e. if there is a hit, then the physical address is returned. Otherwise, i.e. in the case of a miss, an entry is inserted into a TLB miss queue 530. This causes entries to be obtained (e.g. from a level two TLB) 540 and inserted into the level one TLB 520. However, if there is no space in the TLB miss queue then a further request is made for the translation to be provided into the level two TLB 540 if it is not already there. Consequently, when the TLB miss queue 530 frees up space, allowing the entry to be inserted, the translation should be quickly found within the level two TLB 540 thereby reducing the latency compared to obtaining the translation from main memory.

Figure 6:
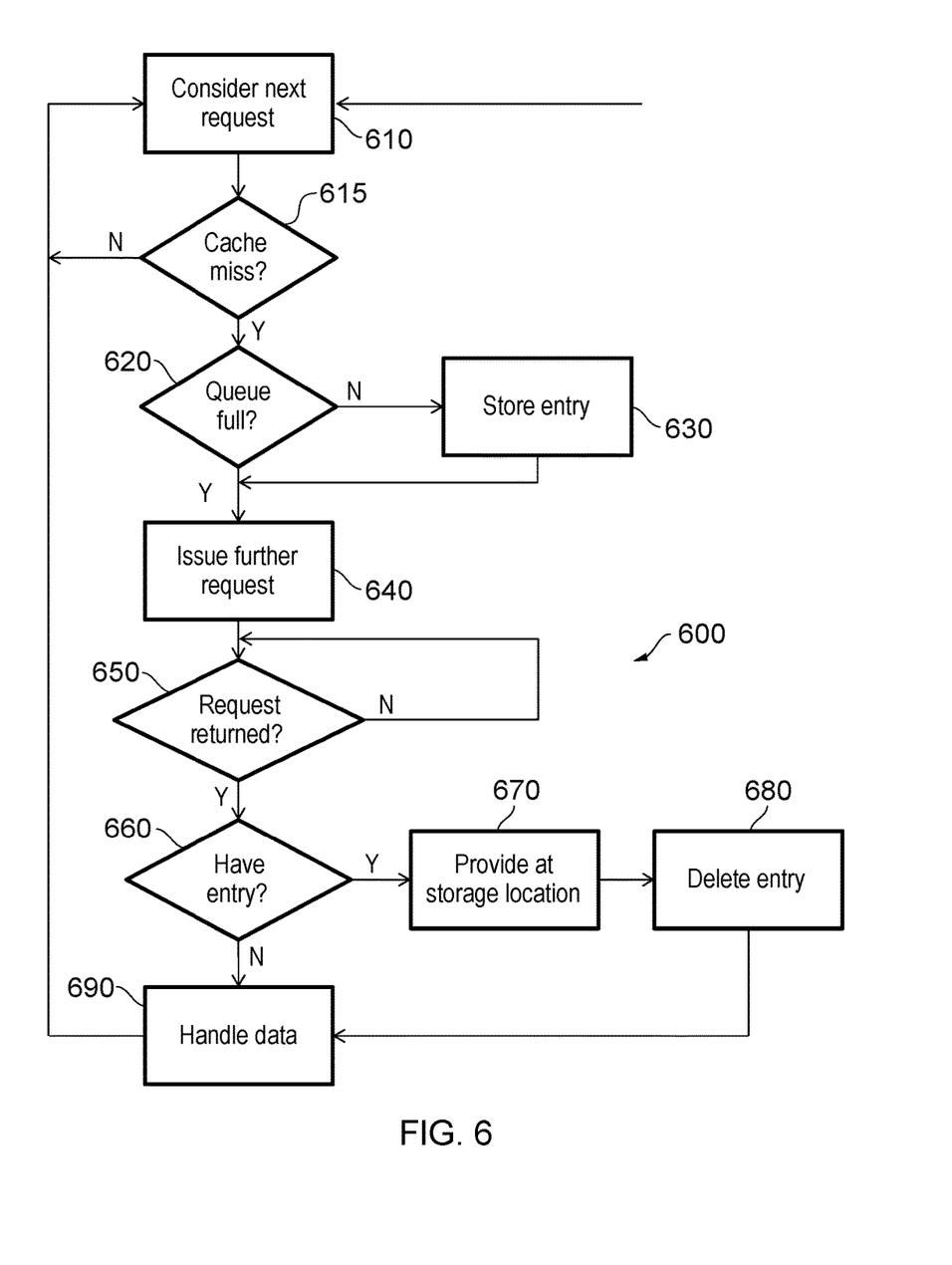
FIG. 6 illustrates a flow chart 600 in accordance with one embodiment.

FIG. 6 illustrates a flow chart 600. At a step 610 the next request in the queue circuitry is considered. At a step 615, it is determined whether the request can be resolved from the cache. If so, the request can be directly addressed and then the process returns to step 610. Otherwise, at a step 620, it is determined whether or not the queue in the resolution circuitry is full or not. If not, then at step 630, the entry is stored in the resolution circuitry. At a step 640, a further request is issued. At a step 650, it is determined whether or not a response to the request has been received. If not, the process returns to step 650. In other words, step 650 causes the process to wait until the request is returned. When the request is returned, then at step 660, it is determined whether an entry for this data is stored in the resolution circuitry (i.e. whether an entry was stored in step 630). If so, then at step 670, the returned data is provided at the storage location that was stored in combination with the data in the resolution circuitry at step 680, the entry in the resolution circuitry is deleted, and the process continues to step 690. In any event, at step 690, the data is handled. For example, the data may be stored in a cache. The process then returns to step 610.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   queue circuitry to respond to control signals each associated with a memory access instruction, and to queue a plurality of requests for data, each associated with a reference to a storage location;
   resolution circuitry to acquire a request for data, and to issue said request for data, said resolution circuitry having a resolution circuitry limit; and
   when a current capacity of said resolution circuitry is below said resolution circuitry limit, said resolution circuitry acquires said request for data by receiving said request for data from said queue circuitry, stores said request for data in association with said storage location, issues said request for data, and causes a result of issuing said request for data to be provided to said storage location; and
   when said current capacity of said resolution circuitry meets or exceeds said resolution circuitry limit, said resolution circuitry acquires said request for data by examining a next request for data in said queue circuitry and issues a further request for said data based on said request for data.

2. A data processing apparatus according to claim 1, wherein
   said resolution circuitry acquires an oldest request for data from said queue circuitry.

3. A data processing apparatus according to claim 2, wherein
   each of the requests for data comprises an indication of whether said resolution circuitry has examined that request for data;
   when said current capacity of said resolution circuitry meets or exceeds said resolution circuitry limit, said resolution circuitry additionally sets said indication to indicate that request for data has been examined; and
   said resolution circuitry acquires an oldest request for data from said queue circuitry with an indication that request for data is unexamined by said resolution circuitry.

4. A data processing apparatus according to claim 1, further comprising:
   a cache that forms part of a memory hierarchy, to store data retrieved from said memory hierarchy.

5. A data processing apparatus according to claim 4, wherein
   said cache comprises a level one cache; and
   said queue circuitry responds to each queued request for data by accessing said data from the level one cache when it is present in said level one cache and providing said request for data to said resolution circuitry when said data is absent from said level one cache and said current capacity of said resolution circuitry is below said resolution circuitry limit.

6. A data processing apparatus according to claim 5, further comprising:
   a fill buffer to receive said request for data and to acquire said data from said memory hierarchy, wherein
   said queue circuitry is an issue queue to receive said control signals from an instruction decoder;
   said request for data is a memory read request to read said data from said memory hierarchy;
   said further request for data comprises a memory prefetch request to read said data from said memory hierarchy and provide said data to said level one cache;
   said resolution circuitry comprises a load replay queue; and
   when said current capacity of said resolution circuitry meets or exceeds said resolution circuitry limit, said resolution circuitry issues said further request for said data by inserting an entry in said fill buffer instead of in said resolution circuitry.

7. A data processing apparatus according to claim 6, wherein
   said entry is a prefetch entry to provide said data to said level one cache.

8. A data processing apparatus according to claim 5, wherein
   said queue circuitry comprises an issue queue to receive control signals from an instruction decoder;
   said request for data is a memory store request to store said data to said memory hierarchy; and
   said resolution circuitry comprises a store address buffer.

9. A data processing apparatus according to claim 8, further comprising:
   acquisition circuitry to acquire said data from said memory hierarchy, wherein
   said further request for data comprises a memory read request to read said data from said memory hierarchy; and
   when said current capacity of said resolution circuitry meets or exceeds said resolution circuitry limit, said resolution circuitry issues said further request for said data by inserting an entry in said acquisition circuitry instead of in said resolution circuitry.

10. A data processing apparatus according to claim 4, wherein
    said cache comprises a level two cache.

11. A data processing apparatus according to claim 10, further comprising:
    a prefetch unit to provide unsolicited data to said cache in dependence on training information, wherein
    said further request is provided to said prefetch unit.

12. A data processing apparatus according to claim 10, further comprising:
    said further request is provided to said level two cache to cause said level two cache to acquire said data.

13. A data processing apparatus according to claim 10, wherein
    said queue circuitry comprises a load replay queue;
    said request for data is a memory read request to read said data from said memory hierarchy;
    said resolution circuitry comprises a fill buffer; and
    when said current capacity of said resolution circuitry meets or exceeds said resolution circuitry limit, said further request is a memory prefetch request for said data to be read from said memory hierarchy and provided to said level two cache.

14. A data processing apparatus according to claim 10, further comprising:
    a fill buffer to receive said request for data from said resolution circuitry and to acquire said data from said memory hierarchy, said fill buffer having a fill buffer limit, wherein
    said request for data is a memory read request to read said data from said memory hierarchy;
    said resolution circuitry comprises a load replay queue; and when a current capacity of said fill buffer meets or exceeds said fill buffer limit, said further request is configured as a memory prefetch request for said data to be read from said memory hierarchy and provided to said level two cache.

15. A data processing apparatus according to claim 10, further comprising:
acquisition circuitry to receive said request for data and said further request for data from said resolution circuitry and to acquire said data from said memory hierarchy, said acquisition circuitry having an acquisition circuitry limit, wherein
said queue circuitry comprises an issue queue to receive said control signals from an instruction decoder;
said request for data is a memory store request to store said data to said memory hierarchy; and
said resolution circuitry comprises a store address buffer.

16. A data processing apparatus according to claim 15, wherein
when a current capacity of said acquisition circuitry meets or exceeds said acquisition circuitry limit, said further request is configured as a memory prefetch request for said data to be read from said memory hierarchy and provided to said level two cache.

17. A data processing apparatus according to claim 15, wherein
when a current capacity of said acquisition circuitry meets or exceeds said acquisition circuitry limit, said further request for data comprises an ownership request to obtain ownership of said data.

18. A data processing apparatus according to claim 1, wherein
said further request for data comprises an ownership request to obtain ownership of said data.

19. A data processing apparatus according to claim 1, further comprises:
a level two translation lookaside buffer, wherein
said resolution circuitry is a level one translation lookaside buffer; and
further request for said data causes said data to be stored in said level two translation lookaside buffer.

* * * * *